US011828879B2

(12) United States Patent
Davis et al.

(10) Patent No.: US 11,828,879 B2
(45) Date of Patent: Nov. 28, 2023

(54) VIBRATED POLARIZING BEAM SPLITTER FOR IMPROVED RETURN LIGHT DETECTION

(71) Applicant: LG INNOTEK CO., LTD., Seoul (KR)

(72) Inventors: Ryan T. Davis, Woodside, CA (US); Mohamed S. Seghilani, Sunnyvale, CA (US); Richard S. D'Alo, San Jose, CA (US)

(73) Assignee: LG INNOTEK CO., LTD., Seoul (KR)

( * ) Notice: Subject to any disclaimer, the term of this patent is extended or adjusted under 35 U.S.C. 154(b) by 589 days.

(21) Appl. No.: 16/942,033

(22) Filed: Jul. 29, 2020

(65) Prior Publication Data

US 2022/0035007 A1     Feb. 3, 2022

(51) Int. Cl.
*G01S 7/481*        (2006.01)
*G02B 26/08*      (2006.01)
(Continued)

(52) U.S. Cl.
CPC .......... *G01S 7/4817* (2013.01); *G01S 7/4814* (2013.01); *G01S 17/10* (2013.01); *G01S 17/931* (2020.01);
(Continued)

(58) Field of Classification Search
CPC .................................................. G01S 7/4817
See application file for complete search history.

(56) References Cited

U.S. PATENT DOCUMENTS 5,535,293 A    7/1996   Buchin et al.
6,377,346 B1   4/2002   Väisälä et al.
(Continued)

FOREIGN PATENT DOCUMENTS

CN       102929000 A   *   2/2013
JP        60087442 A   *   5/1985
(Continued)

OTHER PUBLICATIONS

Machine translation of CN-102929000-A (Year: 2013).*
(Continued)

*Primary Examiner* — Yuqing Xiao
*Assistant Examiner* — Zhengqing Qi
(74) *Attorney, Agent, or Firm* — Birch, Stewart, Kolasch & Birch, LLP (57) ABSTRACT

Systems, methods, and computer-readable media are disclosed for a vibrated polarizing beam splitter for improved return light. An example method may involve emitting, by an emitter, a first light pulse. The example method may also involve reflecting, by a polarizing beam splitter in a first position, the first light pulse, wherein the polarizing beam splitter is at a first angle of incidence in the first position. The example method may also involve adjusting, subsequent to the polarizing beam splitter reflecting the first light pulse, a position of the polarizing beam splitter from the first position to a second position, wherein the polarizing beam splitter is at a second angle of incidence in the second position. The example method may also involve transmitting, by the polarizing beam splitter, a return light pulse through the polarizing beam splitter, the return light pulse based on the first light pulse. The example method may also involve detecting, by a detector, the return light pulse.

26 Claims, 7 Drawing Sheets

(51) Int. Cl.
*G01S 17/10* (2020.01)
*G02B 26/10* (2006.01)
*G01S 17/931* (2020.01)

(52) U.S. Cl.
CPC ......... *G02B 26/0816* (2013.01); *G02B 26/10* (2013.01)

(56) References Cited

U.S. PATENT DOCUMENTS

| | | | |
|---|---|---|---|
| 8,446,571 | B2 | 5/2013 | Fiess et al. |
| 10,151,836 | B2 | 12/2018 | O'Keeffe |
| 10,429,289 | B2 | 10/2019 | Knox et al. |
| 10,451,716 | B2 | 10/2019 | Hughes et al. |
| 2011/0128525 | A1 | 6/2011 | Mizuno et al. |
| 2012/0299764 | A1* | 11/2012 | Haneda ............ G01S 17/42 342/54 |
| 2015/0204977 | A1 | 7/2015 | Sakai et al. |
| 2016/0025489 | A1 | 1/2016 | Klepsvik et al. |
| 2017/0123222 | A1 | 5/2017 | Demuth et al. |
| 2017/0234976 | A1 | 8/2017 | Grauer et al. |
| 2017/0343716 | A1 | 11/2017 | Wan et al. |
| 2018/0120433 | A1 | 5/2018 | Eichenholz et al. |
| 2018/0188355 | A1 | 7/2018 | Bao et al. |
| 2018/0231642 | A1* | 8/2018 | Lee ............ G01S 7/4812 |
| 2019/0041521 | A1 | 2/2019 | Kalscheur et al. |
| 2019/0155020 | A1 | 5/2019 | Mikliaev et al. |
| 2021/0349196 | A1* | 11/2021 | Wang ............ G01S 7/4812 |

FOREIGN PATENT DOCUMENTS

| | | |
|---|---|---|
| JP | 2001334872 A | 12/2001 |
| KR | 20190130495 A | 11/2019 |

OTHER PUBLICATIONS

Machine translation of JP60087442A (Year: 1985).*

International Search Report and Written Opinion of the International Searching Authority directed to related International Patent Application No. PCT/US2021/043759, dated Nov. 18, 2021; 10 pages.

Kim et al. "Independent Biaxial Scanning Light Detection and Ranging System Based on Coded Laser Pulses without Idle Listening Time", Sensors (Basel), Sep. 4, 2018, pp. 1-20, vol. 18, 9, doi: 10.3390/s18092943, United States.

Yan et al. "Airborne LiDAR intensity banding: Cause and solution", ISPRS Journal of Photogrammetry and Remote Sensing, Aug. 2018, pp. 301-310, vol. 142, ISSN 0924-2716, United States.

* cited by examiner

VIBRATED POLARIZING BEAM SPLITTER FOR IMPROVED RETURN LIGHT DETECTION

BACKGROUND

In LIDAR systems (for example, vehicle LIDAR systems), an emitter may be used to emit light pulses into the environment. These light pulses may be reflected back towards the LIDAR system from an object in the environment, and a detector of the LIDAR system may detect the return light. The timing of the detected return light may then be used to determine a distance of the object relative to the LIDAR system. In some cases, the LIDAR system may also include a reflective element that is used to reflect emitted light into the environment. For example, the reflective element might be a mirror, and may be used in a coaxial LIDAR system to address parallax issues that may arise in other types of LIDAR systems. One potential downside of using this reflective element, however, is that the reflective element may also be disposed in a path of the detector. Given this, the reflective element has the potential to prevent the return light pulse from reaching the detector (as return light may potentially reflect from the reflective element and away from the detector). To address this, a polarizing beam splitter may be used as the reflective element instead of a standard mirror. The polarizing beam splitter may provide the benefit of reflecting light of certain polarization states and allowing light of other polarization states to transmit through (pass through). As an example, the polarizing beam splitter may reflect s polarized light and allow p polarized light to pass through. Since return light that has reflected from an object may be a mix of s and p polarization, the polarizing beam splitter may allow some of the return light to transmit through to the detector (e.g., the p polarized light). However, the s polarized light may still reflect from the polarizing beam splitter and never reach the detector. As a result of this, in a best case scenario about half of the return light is lost, and in the worst case no light may pass through the polarizing beam splitter towards the detector device. This may reduce the amount of return light that is detected by the detector. Consequentially, the overall effectiveness of the system in detecting returning light may be reduced.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems and methods utilizing a vibrated polarizing beam splitter for improved return light detection in a LIDAR system. At a high-level, the LIDAR system may include at least one or more emitter devices for generating emitted light, one or more detector devices for detecting return light resulting from the emitted light being reflected from objects in the environment, and one or more polarizing beam splitters (hereinafter reference may be may to an "emitter device," "detector device," or "polarizing beam splitter," but such references may similarly apply to any number of such components). More particularly, this disclosure may relate to a LIDAR system that selectively changes a position of a polarizing beam splitter from a first position to a second position using an actuator in order to improve return light detection in the LIDAR system. As described above, some LIDAR systems may employ a polarizing beam splitter. Depending on the polarization state of light that comes into contact with the polarizing beam splitter, the light may either be reflected from and/or transmitted through the polarizing beam splitter. For exemplification purposes, the polarizing beam splitter may reflect s polarized light, which may be desirable if the emitter device of the LIDAR system emits s polarized light (so that the emitted light may reflect into the environment and towards objects). However, in addition to being in the path of light emitted from an emitter device in the LIDAR system, the polarizing beam splitter may also be in the path of any return light that reflects from an object in the environment. This may be problematic, as any return light that is in the same polarization state as the emitted light (e.g., s polarized light to continue the above example) may again be reflected from the polarizing beam splitter and away from any detector device present in the LIDAR system. This return light may then be lost (e.g., never detected by a detector device) and consequentially the LIDAR system may not receive as much information about the object as it may if the light were to instead transmit through the polarizing beam splitter and towards a detector device. It should be noted that although the descriptions herein refer to reflecting emitted light from the polarizing beam splitter and transmitting return light through the polarizing beam splitter, the opposite may apply depending on the configuration of the emitter devices and/or detector devices in the LIDAR system. That is, a LIDAR system may also be configured to emit light through a polarizing beam splitter and reflect return light back towards a detector device. While the systems and methods described herein may be described with respect to only one of these emitter device/detector device configurations in certain portions herein for simplicity, it should be noted that the systems and methods may also apply to any other emitter device/detector device configuration as well. Furthermore, while any examples herein may describe s polarized light being emitted and s and p polarized light returning, p polarized light may also alternatively be emitted in some cases.

In some embodiments, the systems and methods described herein address this problem of "lost" light that is reflected from the polarizing beam splitter by actuating the polarizing beam splitter between one or more different positions throughout a cycle of emitting light and receiving return light. The one or more positions may correspond to the polarizing beam splitter being at a different angle with respect to a frame of reference at different times. This actuation of the polarizing beam splitter may serve to address problem of lost light because the properties of the polarizing beam splitter may be such that the amount of the light in different polarization states that is reflected from and/or transmitted through the polarizing beam splitter respectively may vary depending on the angle of incidence of the polarizing beam splitter. For example, when the polarizing beam splitter is at a first angle, 90% of p polarized light may transmit through the polarizing beam splitter and 40% of s polarized light may transmit through the polarizing beam splitter. When the polarizing beam splitter is at a second angle, 100% of p polarized light may transmit through and 0% of s polarized light may transmit through the polarizing beam splitter. These examples are not intended to be limiting and the actual percentage of light that is reflected from and/or transmitted through the polarizing beam splitter may vary. If the emitted light is of s polarization, and the return light is of mixed polarization (e.g., s polarized and p polarized light), then the two angles may be chosen such that the first angle results in a high amount of reflection of s polarized light, and the second angle results in a high percentage of transmission of both s and p polarized light through the polarizing beam splitter.

Figure 1A:
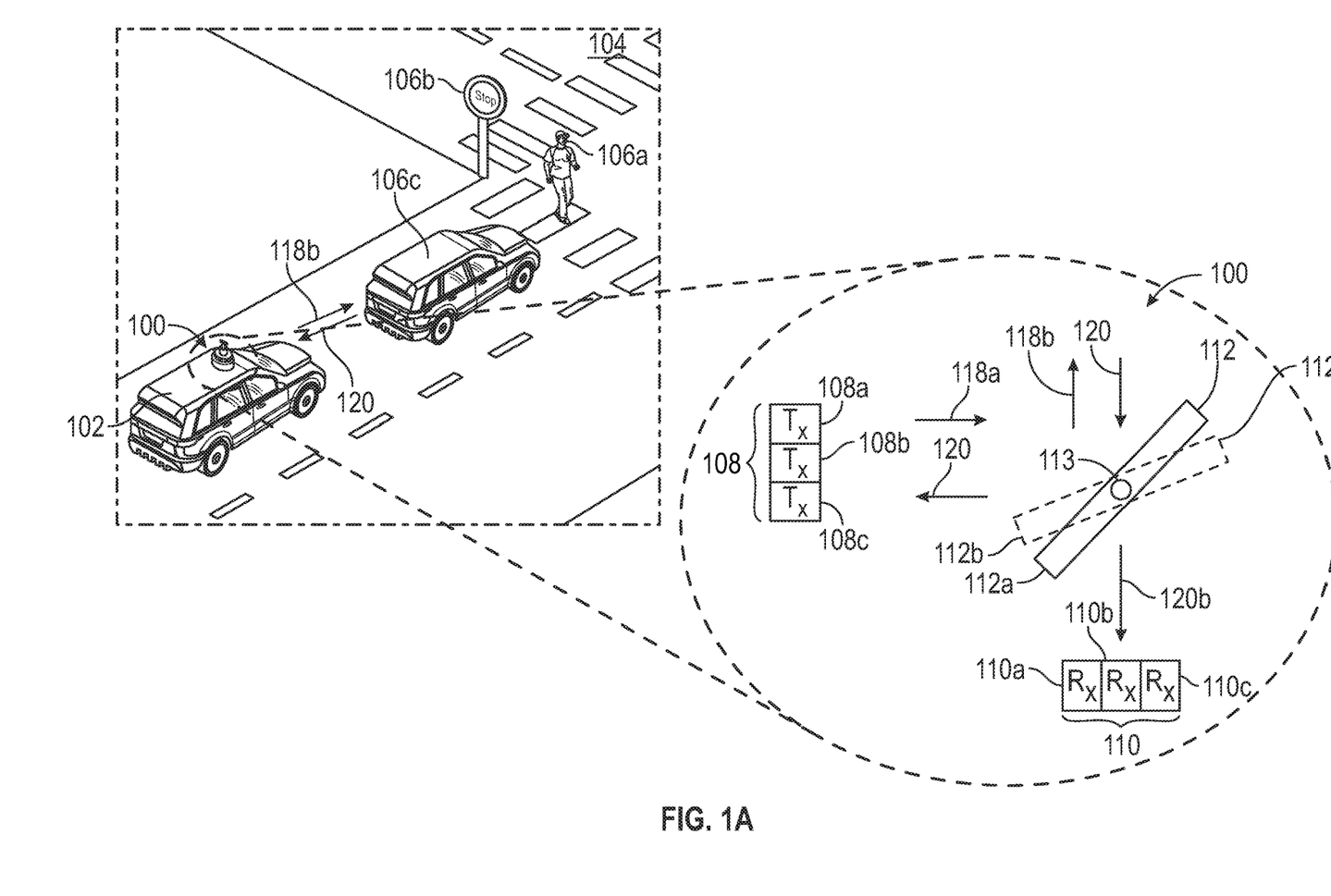
FIGS. 1A-1C depict an example schematic diagram of a vibrated polarizing beam splitter system, in accordance with one or more example embodiments of the disclosure.
Figure 1B:
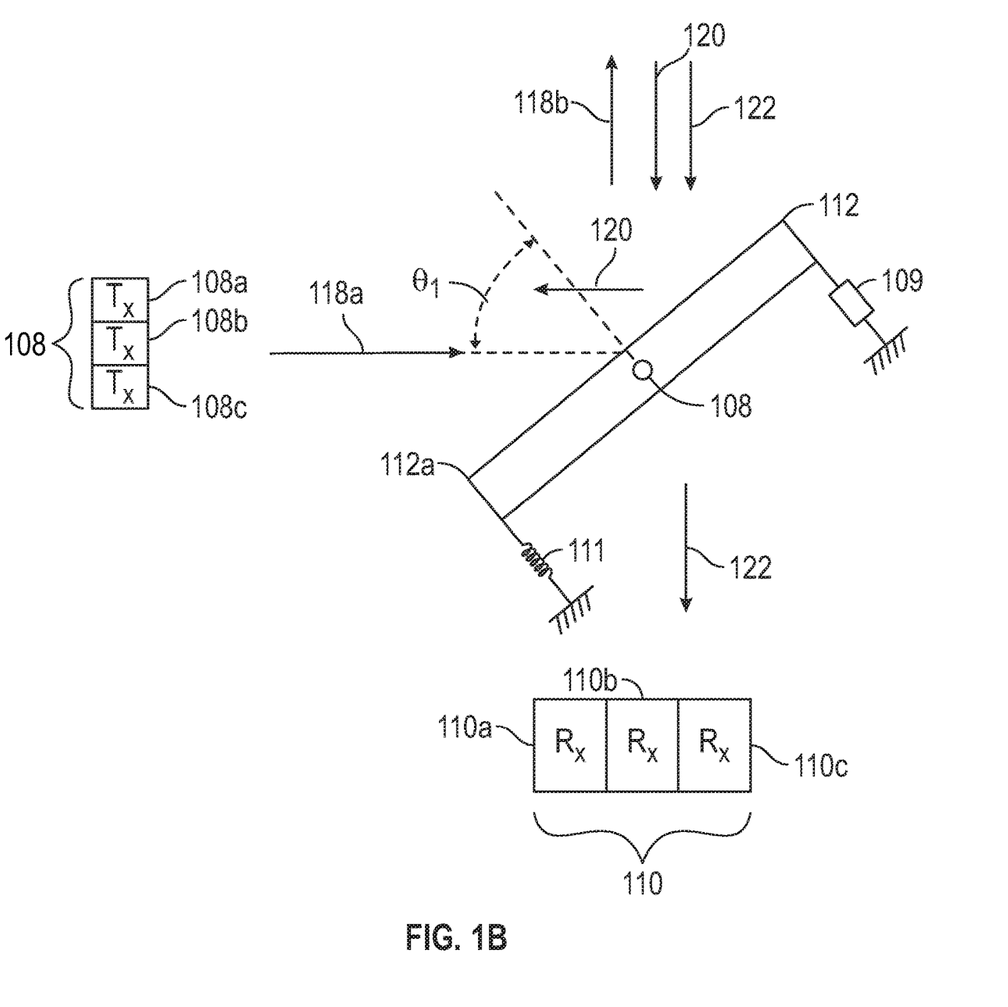
Figure 1C:
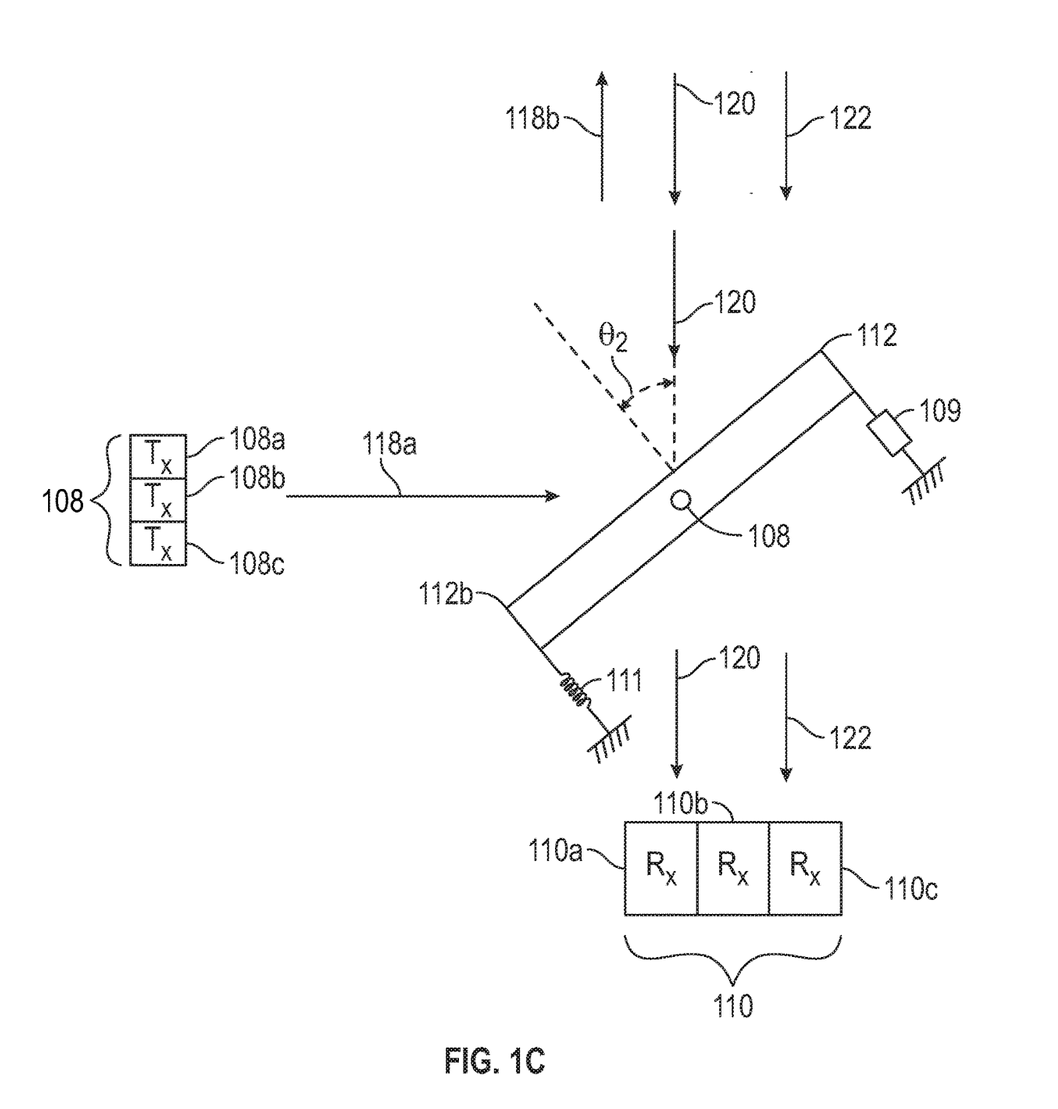

In some embodiments, the rotation of the polarizing beam splitter may be accomplished using an actuator. In some instances, the actuator may be a voice coil motor. In other instances the actuator may be another type of motor, such as a stepper motor, brushed motor, brushless motor, or any other type of motor. To accomplish resonation of the polarizing beam splitter between the two angles, a spring may be attached to one side of the polarizing beam splitter and the motor may be attached to another side of the polarizing beam splitter (for example, as depicted in FIGS. 1B-1C). In such cases, resonation may thus be performed passively through the spring with the motor being used to account for losses. Resonation may also be performed through electrostatic or piezoelectric forces or a signal from a computing system (that is, the vibration of the polarizing beam splitter may be actively controlled by a signal from a controller as well). In some embodiments, to describe the overall process involving the vibrating polarizing beam splitter in more detail, an emitter device of the LIDAR system may emit light towards the polarizing beam splitter. The light emitted by the emitter device may be polarized (for example, the emitted light may be s polarized, but could also be in any other polarization state or combination of polarization states as well). The polarizing beam splitter may be disposed in a path of the emitted light, such that the emitted light travels from the emitter device to the polarizing beam splitter. At the time the light is emitted from the emitter device, the polarizing beam splitter may be in a first position with the emitted light striking the polarizing beam splitter at a first incident angle. The polarizing beam splitter being at the first angle may cause the s polarized emitted light to reflect off of the polarizing beam splitter into an environment of the LIDAR system. The emitted light may then travel through the environment until it reflects from an object in the environment and back towards the LIDAR system. This return light may include a mixture of polarization states (for example, p and s polarization). While it may have been desirable for the emitted light to reflect off of the polarizing beam splitter so that the emitted light may travel into the environment, such reflections may not be as desirable for the return light. This may be because the detector device may be located behind the polarizing beam splitter from the perspective of the return light (e.g., aligned on the same path as the return light), and it may be desirable for as much of the return light as possible to reach the detector device so that the LIDAR system can receive as much return light as possible from the object in the environment. With the polarizing beam splitter at the first angle, the p polarized return light may transmit through the polarizing beam splitter and be received by the detector device. However, at least some of the s polarized return light may reflect off of the polarizing beam splitter, away from the detector device. Thus, some of the return light may be lost if the polarizing beam splitter were to remain in the first position.

In some embodiments, to remedy the loss of s polarized return light that is reflected from the polarizing beam splitter and away from the detector device, the polarizing beam splitter may be rotated to the second position after the emitted light pulse is reflected into the environment. As described above, in the second position the polarizing beam splitter may be orientated at a different angle than when it is in the first position. The properties of the polarizing beam splitter may be such that when it is oriented at the second angle, most (for example, up to 90% or more) of the s polarized light may be transmitted through the polarizing beam splitter rather than being reflected away from the polarizing beam splitter and consequentially away from the detector device (the amount of transmission and/or reflection from the polarizing beam splitter with respect to the s and p polarized light may be further described with reference to FIG. 3 below). That is, by rotating the polarizing beam splitter to the second position after the emitted light from the emitter devices is reflected into the environment, more of the return light may be transmitted through the polarizing beam splitter to reach the detector device upon return, and thus more data from the environment may be collected by the detector device of the LIDAR system. Additionally, the difference in degree between the first angle and the second angle may be relatively small. For example, the difference may be on the order of 1 to 2 degrees, and generally between 1 to 10 degrees. In one example, the first angle may be 45 degrees and the second angle may be 43.5 degrees. Due to the small difference in degree between the first angle in the first position and the second angle in the second position, the actuation of the polarizing beam splitter between these two positions may be performed quickly. That is, rotating back and forth between the two angles so the polarizing beam splitter is at the first position when the light is emitted, at the second position when the return light is received back, and then back at the first angle when the emitters perform a subsequent light emissions. Hence, the polarizing beam splitter may effectively oscillate or vibrate between the first position and the second position at a high frequency as light pulses are emitted by the emitting device and returned as return light from the environment. This small degree of change in positioning and the ability of the polarizing beam splitter to very quickly actuate between the two positions may be important as the polarizing beam splitter may need to actuate quickly enough to keep up with light emissions that are moving at the speed of light. To further increase the vibration speed, multiple smaller polarizing beam splitters may be used instead of a single polarizing beam splitter. The smaller polarizing beam splitters may be able to more quickly rotate and change angles than a single larger polarizing beam splitter.

In some embodiments, the polarizing beam splitter may alternatively be rotated in the same direction to reach the first and second angles, rather than vibrating between two angles. This may be accomplished by starting from the first angle, then rotating the polarizing beam splitter in the same direction by consecutive steps of 360 degrees plus the difference in angle between the first angle and the second angle, and 360 degree minus the difference in angle between the first angle and second angle. This may be easier in practice as it can be achieved without reversing the polarity of the signal driving the motor. This may be applicable in cases where the polarizing beam splitter is driven using a non-vibrating motor (for example a motor other than a voice-coil motor). Furthermore, in such cases the polarizing beam splitter may be able to rotate far beyond the 1 to 10 degrees of movement described above.

Turning to the figures, FIG. 1A includes a schematic diagram of an example LIDAR system 100 (which may be the same as LIDAR system 500 described with respect to FIG. 5 below, as well as any other LIDAR system described herein) that may include a vibrating polarizing beam splitter 112, which may be described in further detail below. The example LIDAR system 100 may also include at least one or more emitting devices 108 (e.g., emitting device 108a, 108b, and/or 108c) and one or more detector devices 110 (e.g., detector device 110a, detector device 110b, and/or detector device 110c). For simplicity, reference may be made hereinafter to an "emitter device 108" and/or a "detector device 110," however, such descriptions may similarly apply to any number of detector emitter devices 108 and or detector devices 110 as well. In some embodiments, the LIDAR system 100 may be incorporated onto a vehicle 102 and may be used at least to provide range determinations for the vehicle 102. For example, the vehicle 102 may traverse an environment 104 and may use the LIDAR system 100 to determine the relative distance of various objects 106 in the environment 104 relative to the vehicle 102. The use of the vibrating polarizing beam splitter 112 within the example LIDAR system 100 may serve to enhance the ability of the LIDAR system 100 to perform range determinations. The vibrating polarizing beam splitter 112 may enhance the ability of the LIDAR system 100 by allowing a maximum amount of light that is transmitted by the LIDAR system 100 towards an object 106 to be received by one or more detectors 110 in the LIDAR system 100 when the light is reflected from the object 106 back towards the LIDAR system 100. It should be noted that although the vibrating polarizing beam splitter 112 may be depicted in FIG. 1A as incorporated onto a vehicle 102, the vibrating polarizing beam splitter 112 may also be implemented in other LIDAR systems other than vehicle LIDAR systems, and may be used outside of the LIDAR context as well.

In some embodiments, the one or more emitter devices 108 may include one or more devices for emitting light (e.g., emitted light 118a and/or emitted light 118b) from the LIDAR system 100 and into the environment 104. As depicted in FIG. 1A, emitted light 118a may be light that is emitted from the emitter device 108 towards the vibrating polarizing beam splitter 112, and emitted light 118b may be the result of the emitted light 118a reflecting from the vibrating polarizing beam splitter 112 into the environment 104. For simplicity sake, reference may be made to "emitted light 118" herein, which may refer to any of emitted light 118a and/or emitted light 118b. For example, the emitter devices 108 may be laser diodes. In some instances, the emitted light 118 may be in the form of a series of pulses. Depending on the configuration of the emitter device 108, the emitted light 118 may be in a particular polarization state. The example emitter device 108 as described herein may emit s polarized light. However, this polarization state for the emitted light 118 may merely be used for the sake of consistently in describing the operation of the vibrating polarizing beam splitter 112 herein, and emitted light 118 of any other polarization state and/or combination of polarization states may also be applicable. After being emitted from the LIDAR system 100 and into the environment 104, the emitted light 118 may then may reflect from an object 106 in the environment 104 and return to the LIDAR system 100 as return light 120. Although FIG. 1 may only depict one light pulse 118 being emitted by the emitter device 108, the emitter device 206 may also emit multiple light pulses 118. In some instances, the light pulses 118 may be emitted at a fixed wavelength falling within a range of 880-930 nm, but may also include any other wavelength as well. However, in some instances, the wavelength of the light pulses 118 may also be variable. Additional properties of the light pulses 118 may also be fixed and/or variable. For example, the amplitude of the pulses may be fixed and/or variable as well.

In some embodiments, the one or more detector devices 110 may include photodiodes for detecting return light 120 that has been reflected from an object 106 (for example, a vehicle 106c) in the environment 104. The photodiodes may specifically include Avalanche Photodiodes (APDs), which in some instances may operate in Geiger Mode. However, any other type of photodetector may also be used. The one or more detector devices 110 may be arranged in an array so as to create a continuous field of view (FOV) of the LIDAR system. One example array configuration may include a two-dimensional (2D) array of 16×2 detector devices 110. The functionality of the detector devices 110 in capturing return light 120 from the environment 104 may serve to allow the LIDAR system 100 to ascertain information about the object 106c in the environment 104. That is, the LIDAR system 100 may be able to determine information such as the distance of the object 106c from the vehicle 102 and the shape and/or size of the object 106c, among other information. In some embodiments, the return light 120 that is reflected from the object 106c in the environment 104 may be of mixed polarization. That is, the return light 120 reflected from the object 106c may be a combination of polarization states rather than the single polarization state of the emitted light 118.

In some embodiments, the vibrating polarizing beam splitter 112 may be a polarizing beam splitter apparatus that is configured to rotate about a fixed point 113, which, in some instances, may be located at the center of the vibrating polarizing beam splitter 112 (the fixed point 113 may also be located at any other point along the vibrating polarizing beam splitter 112 as well). The manner in which the polarizing beam splitter rotates around the fixed point 113 may be depicted and described in more detail with respect to FIGS. 1B-1C. Light (for example, the emitted light 118 and/or return light 120) may interact with the vibrating polarizing beam splitter 112 differently depending on the polarization state of the light. For example, depending on the polarization state of the light, the light may either reflect from the vibrating polarizing beam splitter 112 or transmit through the vibrating polarizing beam splitter 112. Additionally, the vibrating polarizing beam splitter 112 may not necessarily reflect all of the light of one polarization state and transmit all of the light of another polarization state, but may instead transmit and/or reflect a certain percentage of the light of each polarization state. As an example of this concept, the vibrating polarizing beam splitter 112 may reflect 60% of p polarized light and transmit 40% of p polarized light, and may also reflect 30% of s polarized light and may transmit 70% of s polarized light. Additionally, the percentage of light in a particular polarization state that the vibrating polarizing beam splitter 112 reflects and/or transmits may be a factor of the angle of incidence of the vibrating polarizing beam splitter 112. This angle of incidence may refer to an angle at which the light strikes the vibrating polarizing beam splitter 112. That is, the angle of incidence may refer to the angle between the normal of the surface and the direction of the light. Thus, the manner in which light interacts with the vibrating polarizing beam splitter 112 may not only depend on the properties of the vibrating polarizing beam splitter 112 itself, but also may depend on the relative angle of the vibrating polarizing beam splitter 112. This may be of particular importance given that it may be desirable for emitted light 118 and return light 120 to interact with the vibrating polarizing beam splitter 112 in different ways. For example, based on the relative positioning of the emitter device 108 and the detector device 110 as depicted in FIG. 1A, it may be desirable for the emitted light 118 to be reflected from the vibrating polarizing beam splitter 112 into the environment. It may also be desirable for the return light 120 from the environment to transmit through the vibrating polarizing beam splitter 112 in order to travel towards, and be detected by, the detector device 110. The more return light 120 that is reflected from an object 106c in the environment that reaches the detector device 110, the more information the LIDAR system 110 will have at its disposal to perform more effective range determinations for the object 106c.

In some embodiments, the rotation of the vibrating polarizing beam splitter 112 may be performed in any suitable manner capable of providing the precision and speed needed. For example, the vibrating polarizing beam splitter 112 may be rotated using an actuator. In some instances, the actuator may be a voice coil motor. In other instances the actuator may be another type of motor, such as a stepper motor, brushed motor, brushless motor, or any other type of motor. To accomplish resonation of the polarizing beam splitter between the two angles, a spring may be attached to one side of the polarizing beam splitter and the motor may be attached to another side of the polarizing beam splitter (for example, as depicted in FIGS. 1B-1C). In such cases, resonation may thus be performed passively through the spring with the motor being used to account for losses. Resonation may also be performed through electrostatic or piezoelectric forces or a signal from a computing system (that is, the vibration of the polarizing beam splitter may be actively controlled by a signal from a controller as well). This frequency of rotation between the first position 130 and/or the second position 133 may also correspond to the frequency at which the emitter device 108 emits light into the environment 104. This may allow the vibrating polarizing beam splitter 112 to rotate from the first position 130, to the second position 133, and back to the first position 130 before each subsequent light emission from the emitter device 108. The methods used to control the rotation of the vibrating polarizing beam splitter 112 may be depicted in more detail with respect to FIGS. 1B-1C described below (for example, actuation may be performed passively using a motor 109 and a spring 111 depicted in these figures).

In some embodiments, the vibrating polarizing beam splitter 112 may operate to accomplish both the reflecting of the emitted light 118 and the transmission of the return light 120 by taking into account the change in the amount of light of a particular polarization state that is reflected from and/or transmitted through the vibrating polarizing beam splitter 112 based on its angle of incidence. For example, the vibrating polarizing beam splitter 112 may be placed in a first position 130 at a first angle $\theta_1$ (this angle $\theta_1$, as well as the angle $\theta_2$ described below, may be depicted in FIGS. 1B and 1C respectively) when light is being emitted from the emitter device 108 (before the emitted light 118 reaches the vibrating polarizing beam splitter 112). In some instances, the first angle may be 45 degrees. When the vibrating polarizing beam splitter 112 is at the first angle, it may be capable of reflecting all or most of the s polarized light that reaches it. The emitted light 118 from the emitter device 108 may be s polarized, which means that all or almost all of the emitted light 118 may consequentially reflect from the vibrating polarizing beam splitter 112 and into the environment 104. Subsequent to the emitted light reflecting from the vibrating polarizing beam splitter 112 (as shown at 118b) and into the environment 104, the vibrating polarizing beam splitter 112 may be rotated to the second position 133 at the second angle $\theta_2$. In some instances, the second angle may be 43.5 degrees. That is, the difference between the first angle and the second angle may be relatively small (for example, less than two degrees of difference). This may allow the vibrating polarizing beam splitter 112 to quickly actuate between the first position 130 and the second position 133. This may be beneficial because the vibrating polarizing beam splitter 112 may need to perform the actuations quickly enough to effectively keep up with cycles of emitted and return light that are traveling at the speed of light. When the vibrating polarizing beam splitter 112 is at the second angle, it may be capable of transmitting all or most of the s polarized light and also transmitting all or almost all of the p polarized light. That is, in the first angle $\theta_1$ the vibrating polarizing beam splitter 112 is capable of reflecting all or most of the s polarized light, whereas in the second angle $\theta_2$ the vibrating polarizing beam splitter 112 is capable of transmitting all or most of the s polarized light. Thus, the rotation of the vibrating polarizing beam splitter 112 during a cycle of emitting an emitted light 118 into the environment and receiving light reflected from an object 106c as return 120 light may allow for both the transmission from the emitter device 108 and the receipt at the detector device 110 to both be performed. It should be noted that the first angle of 45 degrees and the second angle of 43.5 degrees are merely exemplary and any other combination of angles may be used as well. For example, the first angle may be 42 degrees and the second angle may be 40.5 degrees.

FIGS. 1B and 1C may illustrate how light of different polarization states may interact differently with the vibrating polarizing beam splitter 112 when the vibrating polarizing beam splitter 112 is at various angles (for example, the first angle $\theta_1$ and the second angle $\theta_2$). In particular, FIG. 1B may depict the interaction of light with the vibrating polarizing beam splitter 112 when the vibrating polarizing beam splitter 112 is at the first angle $\theta_1$ (in the first position 130). As shown in the figure, emitted light 118 from the emitter device 108 may reflect from the vibrating polarizing beam splitter 112. This may be because the emitted light 118 may be s polarized and the vibrating polarizing beam splitter 112 may be capable of reflecting all or most of s polarized light in the first position 130 at the first angle $\theta_1$. This light may reflect from the vibrating polarizing beam splitter 112 and into the environment 104 as shown at 118b. As described above, any return light from the environment may be returned at mixed polarization. That is, while the emitted light 118 may be of s polarization, for example, the return light that is reflected from an object 106c may be returned in multiple polarization states (for example, the return light may be circularly and/or elliptically polarized, and may include s polarized return light 120 and p polarized return light 122). Thus, if the vibrating polarizing beam splitter 112 remains in the first position 130 at the first angle $\theta_1$, the s polarized return light 120 may reflect from the vibrating polarizing beam splitter 112 and the p polarized return light 122 may transmit through the vibrating polarizing beam splitter 112 and towards the detector device 110. This means that the p polarized return light 120 may never be detected by the detector device 110 and consequentially that the LIDAR system 100 may lose some of the return light that was reflected from the object 106c in the environment. The result of this may be that the LIDAR system 110 does not receive as much information about the object 106c as it potentially can, which may lead to less effective range determinations.

FIG. 1C may depict the interaction of light with the vibrating polarizing beam splitter 112 when the vibrating polarizing beam splitter 112 is at the second angle $\theta_2$ (in the second position 133). As shown in the figure, emitted light 118 from the emitter device 108 may reflect from the vibrating polarizing beam splitter 112. This may be because the emitted light 118 may be s polarized and the vibrating polarizing beam splitter 112 may be capable of reflecting all or most of s polarized light in the first position 130 at the first angle. This light may reflect from the vibrating polarizing beam splitter 112 and into the environment 104 as shown at 118b. As described above, any return light from the environment may be returned in mixed polarization states. That is, while the emitted light 118 may be of s polarization, for example, the return light that is reflected from an object 106c may be returned in multiple polarization states (e.g., s polarized return light 120 and p polarized return light 122). While the s polarized light would have reflected from the vibrating polarizing beam splitter 112 while it is in the first position, when the vibrating polarizing beam splitter is in the second position 133 at the second angle $\theta_2$, both the p polarized return light 122 and most or all of the s polarized return light 120 may transmit through the vibrating polarizing beam splitter 112 and towards the detector device 110. Thus, significantly more return light (e.g., p polarized return light 122 and s polarized return light 1200 may transmit through the vibrating polarizing beam splitter 112 and towards the detector device 110.

FIGS. 1B-1C also depict an example actuator that may be used to drive the rotation of the vibrating polarizing beam splitter 112. In the example depicted in FIGS. 1B-1C, the actuator may include a motor 109. The motor 109 may be a voice-coil motor, such as a stepper motor, brushed motor, brushless motor, or any other type of motor. The motor 109 may be located on one end of the polarizing beam splitter 112. Additionally, a spring 111 may be located on another end of the polarizing beam splitter 112. A pivot point (for example, the fixed point 113 described above) may exist along the polarizing beam splitter 112 between the motor 109 and the spring 111. The spring 111 may be tuned with the mirror mass and pivot point 108 and may be designed to resonate at a set frequency. The resonation may cause the polarizing beam splitter 112 to rotate between two extremes, which may be the first position 112a and the second position 112b. The motor 109 may be used to drive the resonant frequency to overcome losses in the spring 111. The actuator may also include an encoder. The encoder may be optical, may be magnetic, or may be built into the motor 109 itself. The encoder may provide information to the LIDAR system 100 about the position of the polarizing beam splitter 112. Based on this information, the emitter device 108 may be able to emit light at a time at which the polarizing beam splitter is at the first angle. In some instances when the resonation is performed passively, this may be used for an initial emission from the emitter device 108 and subsequent emissions may be based on a particular frequency that aligns with the resonant frequency of the actuator. In some cases, however, the emitting device 108 may alter the timing of emissions based on information from the encoder. For example, if the timing of the resonation of the polarizing beam splitter 112 were to change.

It should again be noted that while the examples provided herein may describe an emitter emitting s polarized light and return light including p and s polarized light, any type of polarized light in any combination may similarly be substituted. For example, if p polarized light were emitted from the emitter, then the first position 130 of the vibrating polarizing beam splitter 112 would be selected such that p polarized light is reflected from the vibrating polarizing beam splitter 112.

Illustrative Plots and Processes

Figure 2:
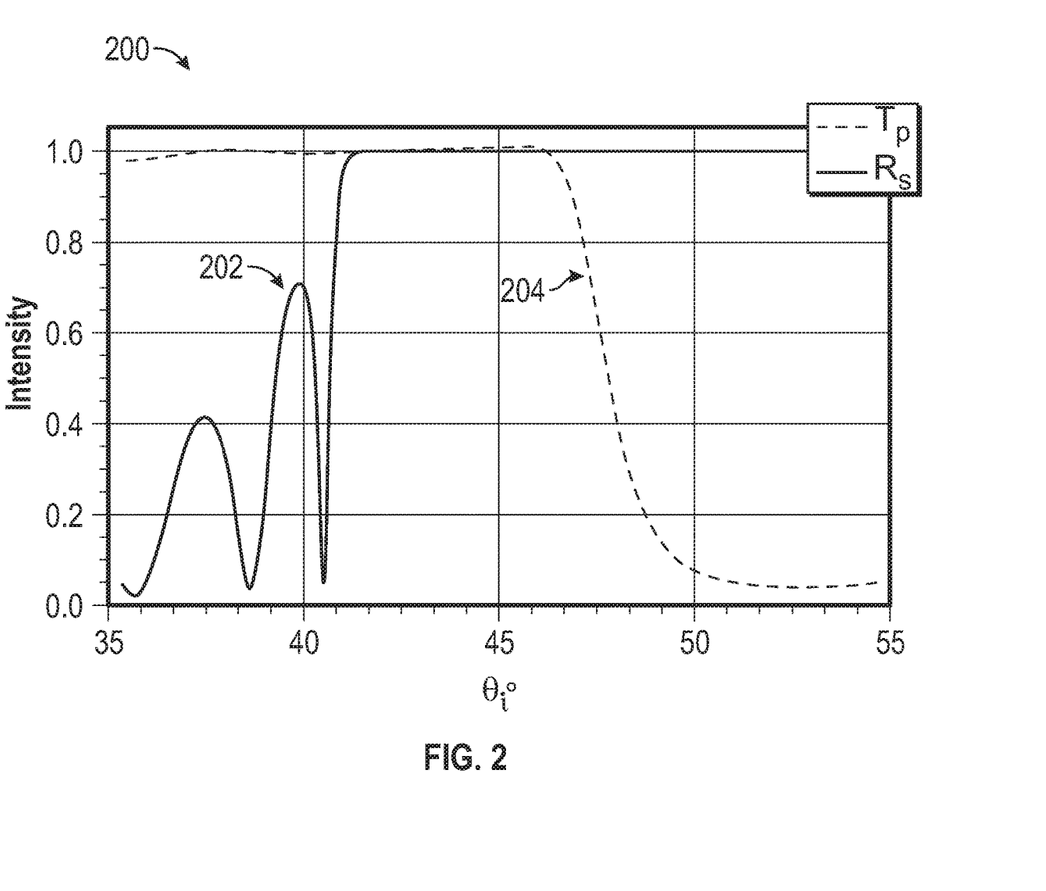
FIG. 2 depicts an example graph depicting transmission and reflective intensities based on various angles of a polarizing beam splitter, in accordance with one or more example embodiments of the disclosure.

FIG. 2 depicts an example graph 200 depicting various transmission and reflection intensities of s polarized and p polarized light with respect to a polarizing beam splitter based on the angle of the polarizing beam splitter. The x-axis of the graph 200 may represent the angle of incidence of the polarizing beam splitter and the y-axis may represent the intensity of either transmission or reflection (e.g., the percentage of light that is transmitted or reflected through or form the polarizing beam splitter respectively). The graph 200 may include two individual plots. The first plot 202 may represent the amount of light that is reflected of the s polarized light, and the second plot 204 may represent the amount of light that is transmitted of the p polarized light. For example, an angle of incidence of 45 degrees may correspond to an intensity value of 1.0 on both the first plot 202 and the second plot 204. This may mean that at the angle of incidence of 45 degrees, 100% of the p polarized light may be transmitted through the polarizing beam splitter, and 100% of the s polarized light may be reflected away from the polarizing beam splitter. This may be desirable when the light pulse is emitted from the emitting device (for example, as s polarized light) and needs to be reflected off of the polarizing beam splitter and into the environment. Thus, 45 degrees may be chosen as the first angle of incidence as described above. Additionally, the graph 200 may also show that an angle of incidence of approximately 43.5 degrees may result in an intensity value of 1.0 for the transmission of p polarized light as shown in plot 204, and may also result in an intensity value of 0.0 (or close to 0.0) for the reflection of the s polarized light as shown in plot 202. That is when the angle of incidence of the polarizing beam splitter is 43.5 degrees, most or all of the p polarized light may transmit through the polarizing beam splitter, and most or all of the s polarized light may also transmit through the polarizing beam splitter. This may be desirable when the return light is returning after being reflected from an object in the environment of the LIDAR system, comprising s polarized and p polarized light, and may need to transmit through the polarizing beam splitter and into the detectors. Thus, approximately 43.5 degrees may be chosen as the second angle of incidence, as described above.

Figure 3:
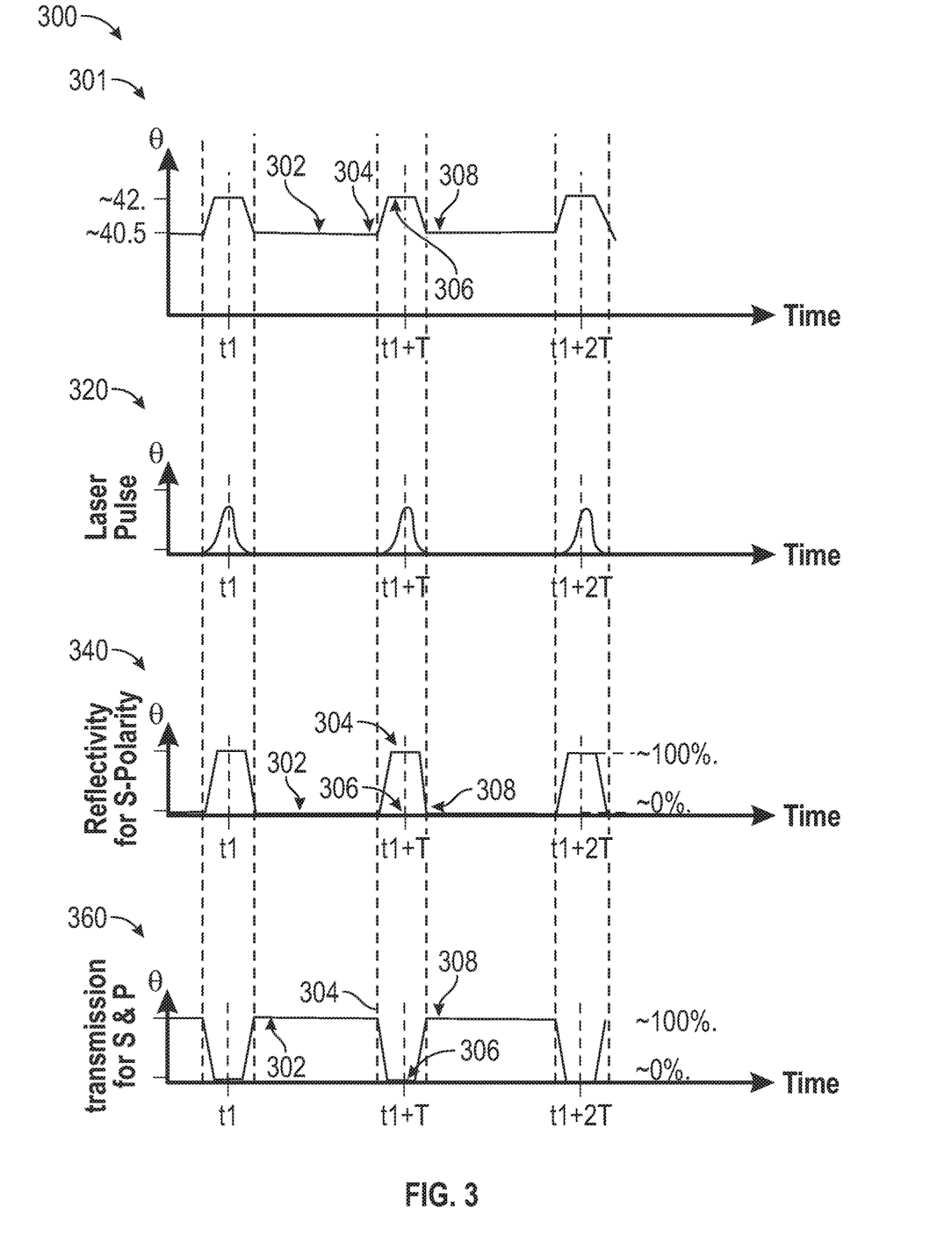
FIG. 3 depicts example plots depicting various properties of the LIDAR system at various times, in accordance with one or more example embodiments of the disclosure.

FIG. 3 includes example plots depicting various properties of the LIDAR system at various times. In particular, FIG. 3 depicts four different plots (plot 301, plot 320, plot 340, and plot 360). The x-axis on each of the four plots may represent time, and all of the x-axes of the four plots may be the same. That is, a time at one location on the x-axis of plot 301 may be the same time as a time at the same location on the x-axis of plot 320, and so on.

In some embodiments, plot 301 depicts the changing of the angle of incidence of the polarizing beam splitter over time. For example, the polarizing beam splitter may be in the first angle of incidence (e.g., approximately 45 degrees) for a first period of time 302. The first period of time may represent the period before a light pulse emitted from a laser reaches the polarizing beam splitter. At a first transition time 304, the polarizing beam splitter may transition from the first angle of incidence to the second angle of incidence (e.g., approximately 43.5 degrees). This first transition time 304 may correspond to a time after the light pulse emitted from the laser of the LIDAR system has reflected from the polarizing beam splitter and into the environment, as described above. The polarizing beam splitter may remain in the second angle of incidence for a second period of time 306. The second period of time 306 may correspond to the time between the emitted light pulse reflecting from the polarizing beam splitter and the return light returning back to the polarizing beam splitter from the environment. The angle of incidence may then transition back to the first angle of incidence at a second transition time 308 in preparation for a subsequently emitted pulse of light from the laser of the LIDAR system. This process may iterate as shown in plot 301.

In some embodiments, plot 320 depicts the timing of the light pulses from the laser of the LIDAR system with respect to the changing of the angle of incidence of the polarizing beam splitter.

In some embodiments, plots 340 and 360 depict the transmission and reflectivity of s polarized light through and from the polarizing beam splitter respectively. As depicted in plot 340, during the first period of time 302 the transmission of the s polarized light through the polarizing beam splitter may be zero or close to zero. Likewise, as depicted in plot 360, the reflectivity of the s polarized light through the polarizing beam splitter may be maximized at during the first period of time 302. As mentioned above, this first period of time 302 may correspond to the time during which the light pulse is emitted from the laser of the LIDAR system and reflected from the polarizing beam splitter. Then, at the first transition time 304 the angle of incidence is changed from the first angle of incidence to the second angle of incidence. As a result of this, the transmission of s polarizing light through the polarizing beam splitter may maximize, and the reflectively may drop to zero or close to zero. As depicted in plots 340 and 360, the transmission and reflectivity of the s polarized light may remain at these values for the second period of time 306. Finally, at the second transition time 308, the transmission of s polarized light through the polarizing beam splitter may return to zero or close to zero, and the reflectivity of s polarized light from the polarizing beam splitter may return to a maximum value. As mentioned above, this process may iterate as shown in the plots 340 and/or 360.

Figure 4:
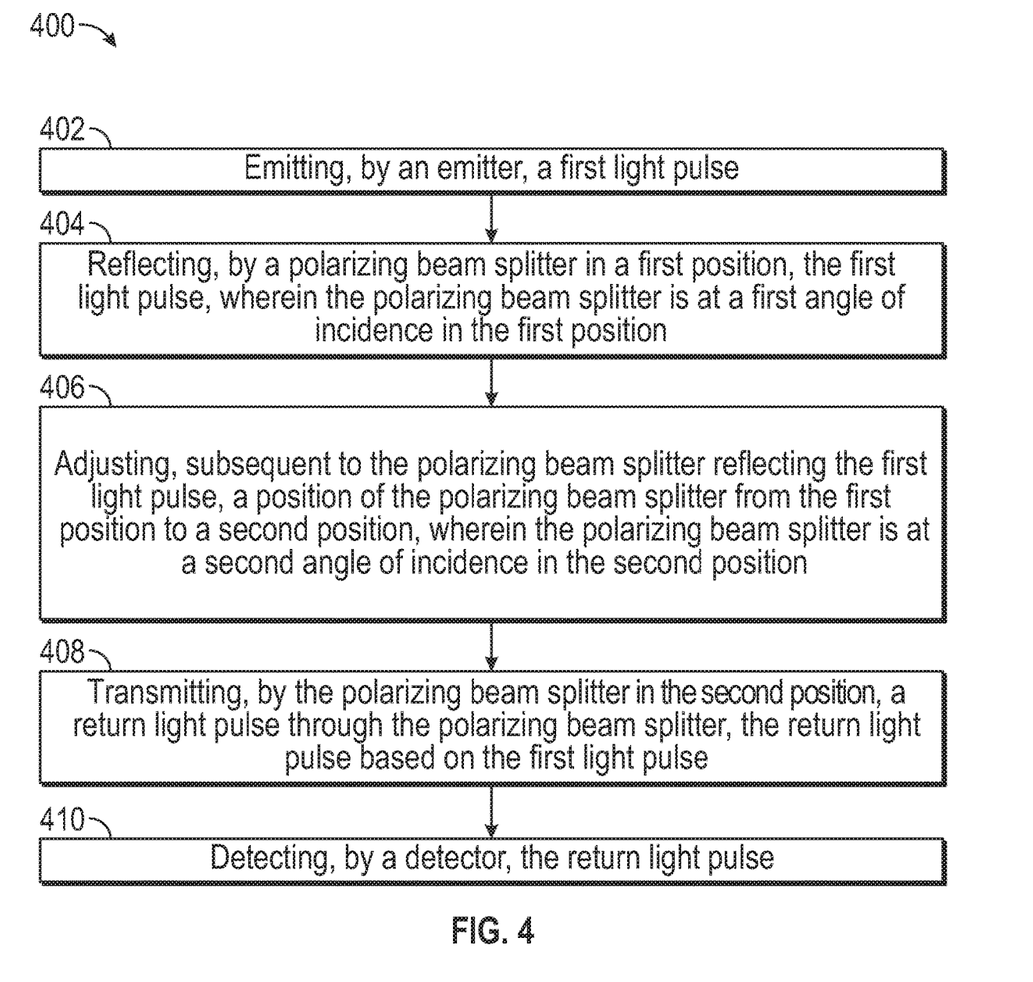
FIG. 4 depicts an example method in accordance with one or more example embodiments of the disclosure.

FIG. 4 is an example method 400 for a vibrated polarizing beam splitter in accordance with one or more example embodiments of the disclosure. In FIG. 4, computer-executable instructions of one or more module(s) of the LIDAR system 200, such as the polarizing beam splitter actuation module 228 may be used to perform the example method 400. However, the method 400 may also be performed without the use of computer-executable instructions, for example, through the use of a resonating circuit connected to an actuation component, such as a voice coil motor as described above.

At block 402 of the method 400 in FIG. 4, the method may include emitting, by n emitter, a first light pulse. In some instances, the emitter may be a laser diode. While block 402 may describe the use of one emitter, multiple emitters emitting multiple light pulses at the same time or in staggered time intervals may also be used. In some instances, different lasers may emit light pulses in different directions. Additionally, the light may be emitted as a series of pulses. The properties of the emitted light, such as frequency and amplitude, among other properties, may remain fixed in each successive light emission. For example, the frequency of the light emitted from the laser may be in the range of 880-930 nm. However, these properties may also be variable as well. For example, a laser may emit light at a first amplitude at a first time, and may subsequently emit light at a greater amplitude at a second time. In some embodiments, the laser may be a laser diode of a LIDAR system, where the vehicle LIDAR system may be used for detecting objects in an environment of the vehicle.

Block 404 of the method 400 may include reflecting, by a polarizing beam splitter in a first position, the first light pulse, wherein the polarizing beam splitter is at a first angle of incidence in the first position. In some embodiments, the selection of the first position of the polarizing beam splitter may be based on the polarizing beam splitter reflecting the type of polarized light that is emitted by the emitter. For example, the first light pulse may be emitted from the emitter as s polarized light (however, as mentioned above, the emission of s polarized light may merely be exemplary and light of various other polarizations states may also be emitted), and in such cases the first position for the polarizing beam splitter may be selected such that the polarizing beam splitter reflects s polarized light in the first position. The first position may correspond with a first angle of incidence of approximately 45 degrees with respect to the normal, for example. This reflection of s polarized light may be desirable when the light pulse is being emitted from the laser as this may allow for the light pulse to reflect off the polarizing beam splitter and into the environment. Once in the environment, the light pulse may reflect back from an object and return back to the LIDAR system. This may allow the LIDAR system to determine information about objects in an environment of the LIDAR system, such as their distance from the LIDAR system, size, and/or shape, among other information.

Block 406 of the method 400 may include adjusting, subsequent to the polarizing beam splitter reflecting the first light pulse, a position of the polarizing beam splitter from the first position to a second position, wherein the polarizing beam splitter is at a second angle of incidence in the second position. In some instances, the difference in degrees between the first angle of incidence and the second angle of incidence may be 5 degrees or less, or more particularly, may be approximately a 1-2 degree difference. This adjustment may be made because while the light pulse emitted from the laser is s polarized, a return light reflected from an object in the environment of the LIDAR system may be of mixed polarization, such as s polarized light and p polarized light. Continuing the same example as above with s polarized light being emitted from the emitter, in the first position the polarizing beam splitter may be configured to allow p polarized light to transmit through. However, as mentioned above, any s polarized light may still reflect from the polarizing beam splitter while the polarizing beam splitter is at the first angle. The reflection of s polarized light may be desirable when the light pulse is emitted from the laser so that the light pulse may be reflected into the environment, however, this reflection may not be desirable for the return light. This may be because the detectors of the LIDAR system may be located along the return path of the light and behind the polarizing beam splitter from the perspective of the return light. That is, if any of the return light were to reflect from the polarizing beam splitter instead of transmitting through it, the reflected light may not reach the detectors. This may be undesirable as it may be desirable to receive as much return light as possible at the detectors so as to receive as much information as possible about the object from which the return light was reflected.

In some embodiments, to remedy the above potential loss of s polarized return light, the adjustment of the polarizing beam splitter from the first position to the second position may be performed. The adjustment may be performed, for example, using an actuator. In some instances, the actuator may include a voice coil motor. The actuator may be controlled in any number of ways, including the use of a resonating circuit (e.g., an RLC circuit), a signal from a computing system (e.g., the computing portion 513 described with respect to FIG. 5), etc. The adjustment may remedy the loss of s polarized light because at the second angle of incidence the properties of the polarizing beam splitter may be such that s polarized light transmits through the polarizing beam splitter instead of reflecting off of the polarizing beam splitter. Given this, when the polarizing beam splitter is in the second position, both the p polarized light and the s polarized light may transmit through the polarizing beam splitter towards the detectors, resulting in more efficient light capture by the LIDAR system. This adjustment may take place after the light pulse has been reflected from the polarizing beam splitter and has been transmitted into the environment. In this manner, the emitted light pulse from the laser may be reflected from the polarizing beam splitter and into the environment while the polarizing beam splitter is in the first position, the polarizing beam splitter can rotate to the second position, and then the return s polarized and p polarized light can transmit through the polarizing beam splitter and to the detectors. This process may repeat iteratively for each successive emitted light pulse from the laser, such that the polarizing beam splitter may effectively be "vibrating" between the first position and the second position. Additionally, the relatively small change in degrees between the first angle of incidence and second angle of incidence may play an important role, as the polarizing beam splitter may need to be vibrating between the two angles quickly enough to meet the timing requirements of the LIDAR system. That is, the emitted light pulse and return light may be moving at the speed of light, so the change in angle may need to take place quickly. Furthermore, while the LIDAR system described herein may be described as including one polarizing beam splitter, multiple smaller polarizing beam splitters may be used. This may be beneficial because the smaller polarizing beam splitters may be able to rotate faster than a single polarizing beam splitter.

Block 408 of the method 400 may include transmitting, by the polarizing beam splitter in the second position, a return light pulse through the polarizing beam splitter, the return light pulse based on the first light pulse. In some embodiments, transmitting the return light pulse may involve the return light pulse traveling through the polarizing beam splitter without reflecting off onto a new path. The return light may be transmitted through the polarizing beam splitter and into the detector. In some embodiments, subsequent to the return light pulse transmitting through the polarizing beam splitter, the polarizing beam splitter may be actuated back to the first position in anticipation of a subsequent emitted light pulse to be reflected into the environment. This process of alternating between the first position and second position may be performed iteratively for any number of emitted light pulses from the LIDAR system.

Block 410 of the method 400 may include detecting, by a detector, the return light pulse. The detectors may include, for example, photodetectors for detecting photons (the return light). In particular, the photodetectors may include Avalanche Photodiodes, which may operate in Geiger Mode. However, other types of photodetectors may also be used to serve a similar purpose.

The operations described and depicted in the illustrative process flow of FIG. 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

One or more operations of the process flow of FIG. 4 may have been described above as being performed by a user device, or more specifically, by one or more program modules, applications, or the like executing on a device. It should be appreciated, however, that any of the operations of process flow of FIG. 4 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flow of FIG. 4 may be described in the context of the illustrative vibrating polarizing beam splitter, it should be appreciated that such operations may be implemented in connection with numerous other device configurations.

Example Lidar System

Figure 5:
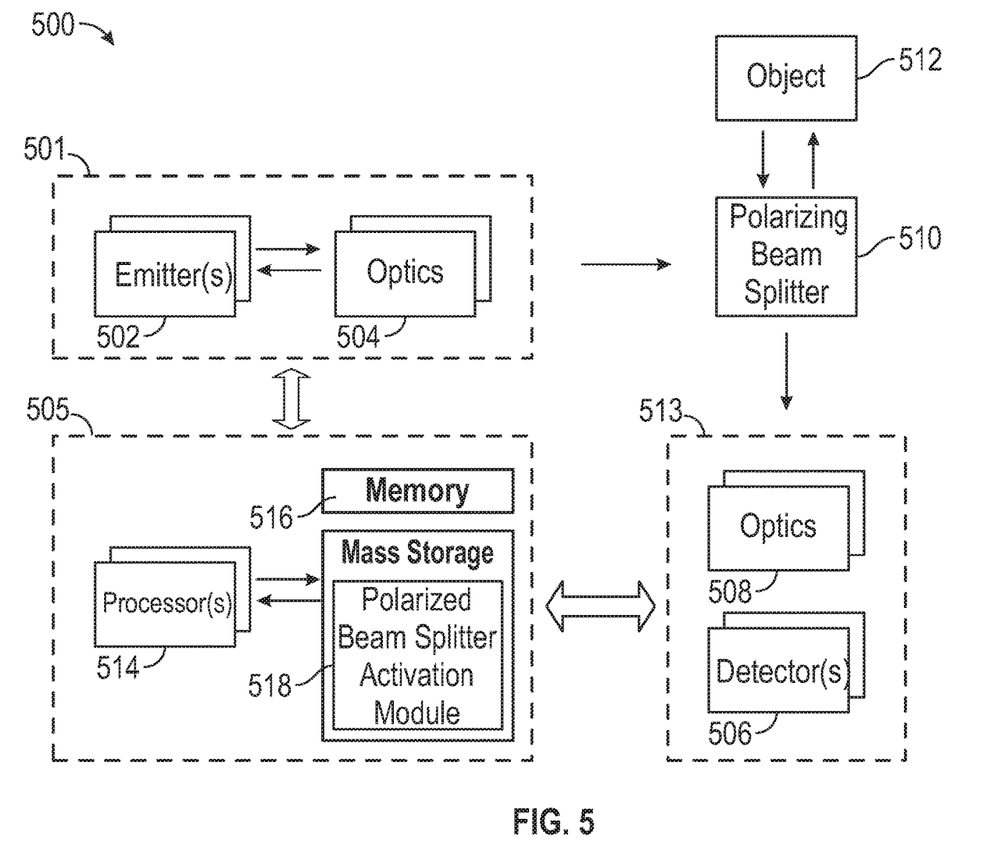
FIG. 5 depicts an example LIDAR system architecture in accordance with one or more example embodiments of the disclosure.

FIG. 5 illustrates an example LIDAR system 500, in accordance with one or more embodiments of this disclosure. The LIDAR system 500 may be representative of any number of elements described herein, such as the LIDAR system 100 described with respect to FIG. 1A, as well as any other LIDAR systems described herein. The LIDAR system 500 may include at least an emitter portion 501, a detector portion 505, and a computing portion 513. In some instances, the LIDAR system may also include a polarizing beam splitter 510.

In some embodiments, the emitter portion 501 may include at least one or more emitter(s) 502 (for simplicity, reference may be made hereinafter to "an emitter," but multiple emitters could be equally as applicable) and/or one or more optical element(s) 504. An emitter 502 may be a device that is capable of emitting light into the environment. Once the light is in the environment, it may travel towards an object 512. The light may then reflect from the object and return towards the LIDAR system 500 and be detected by the detector portion 505 of the LIDAR system 500 as may be described below. For example, the emitter 502 may be a laser diode as described above. The emitter 502 may be capable of emitting light in a series of pulses. An optical element 504 may be an element that may be used to alter the light emitted from the emitter 502 before it enters the environment. For example, the optical element 504 may be a lens, a collimator, or a waveplate. In some instances, the lens may be used to focus the emitter light. The collimator may be used to collimate the emitted light. That is, the collimator may be used to reduce the divergence of the emitter light. The waveplate may be used to alter the polarization state of the emitted light. Any number or combination of different types of optical elements 504, including optical elements not listed herein, may be used in the LIDAR system 500.

In some embodiments, the detector portion 505 may include at least one or more detector(s) 506 (for simplicity, reference may be made hereinafter to "a detector," but multiple detectors could be equally as applicable) and/or one or more optical elements 508. The detector may be a device that is capable of detecting return light from the environment (e.g., light that has been emitted by the LIDAR system 500 and reflected by an object 512). For example, the detectors may be photodiodes. The photodiodes may specifically include Avalanche Photodiodes (APDs), which in some instances may operate in Geiger Mode. However, any other type of photodetector may also be used. The functionality of the detector 506 in capturing return light from the environment may serve to allow the LIDAR system 100 to ascertain information about the object 512 in the environment. That is, the LIDAR system 100 may be able to determine information such as the distance of the object from the LIDAR system 100 and the shape and/or size of the object 512, among other information. The optical element 508 may be an element that is used to alter the return light traveling towards the detector 506. For example, the optical element 508 may be a lens, a waveplate, or filter such as a bandpass filter. In some instances, the lens may be used to focus return light on the detector 506. The waveplate may be used to alter the polarization state of the return light. The filter may be used to only allow certain wavelengths of light to reach the detector (e.g., a wavelength of light emitted by the emitter 502). Any number or combination of different types of optical elements 508, including optical elements not listed herein, may be used in the LIDAR system 500.

In some embodiments, the computing portion may include one or more processor(s) 514 and memory 516. The processor 514 may execute instructions that are stored in one or more memory devices (referred to as memory 516). The instructions can be, for instance, instructions for implementing functionality described as being carried out by one or more modules and systems disclosed above or instructions for implementing one or more of the methods disclosed above. The processor(s) 514 can be embodied in, for example, a CPU, multiple CPUs, a GPU, multiple GPUs, a TPU, multiple TPUs, a multi-core processor, a combination thereof, and the like. In some embodiments, the processor(s) 514 can be arranged in a single processing device. In other embodiments, the processor(s) 514 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 514 can access the memory 516 by means of a communication architecture (e.g., a system bus). The communication architecture may be suitable for the particular arrangement (localized or distributed) and type of the processor(s) 514. In some embodiments, the communication architecture 506 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCM-CIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 516 also can retain data.

Each computing device 500 also can include mass storage 517 that is accessible by the processor(s) 514 by means of the communication architecture 506. The mass storage 517 can include machine-accessible instructions (e.g., computer-readable instructions and/or computer-executable instructions). In some embodiments, the machine-accessible instructions may be encoded in the mass storage 517 and can be arranged in components that can be built (e.g., linked and compiled) and retained in computer-executable form in the mass storage 517 or in one or more other machine-accessible non-transitory storage media included in the computing device 500. Such components can embody, or can constitute, one or many of the various modules disclosed herein. Such modules are illustrated as polarizing beam splitter actuation module 520.

The polarizing beam splitter actuation module 520 including computer-executable instructions, code, or the like that responsive to execution by one or more of the processor(s) 514 may perform functions including, but not limited to, selectively adjusting the angle of incidence of the polarizing beam splitter between at least two positions, a first angle of incidence and a second angle of incidence. The polarizing beam splitter actuation module 520 may also be responsible for ensuring that the timing of the emissions from an emitter device (e.g., emitter device 502) are such that the vibrating polarizing beam splitter 510 is able to transition between the first position, to the second position, and back to the first position between light emissions. The synchronization of the timing may depend on a number of variables, such as the thermal power of the emitter 502, range aliasing considerations, etc. Additionally, the functions may include execution of any other methods and/or processes described herein.

In some embodiments, the polarizing beam splitter 510 may be the same as polarizing beam splitter 112 or any other polarizing beam splitter 510 described herein. That is, the polarizing beam splitter 510 may be used to reflect light emitted from the emitter 502 and transmit (pass through) return light from the environment towards the detector 506. As described above, the emitter and detector configuration can be flipped, such that emitted light may be transmitted through the polarizing beam splitter 510 and return light may reflect from the polarizing beam splitter 510 towards the detector 506.

It should further be appreciated that the LIDAR system 500 may include alternate and/or additional hardware, software, or firmware components beyond those described or depicted without departing from the scope of the disclosure. More particularly, it should be appreciated that software, firmware, or hardware components depicted as forming part of the computing device 500 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface,"

"component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analog or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

That which is claimed is:

1. A method comprising:
   emitting, by an emitter, a first light pulse;
   reflecting, by a polarizing beam splitter in a first position, the first light pulse, wherein the polarizing beam splitter is at a first angle of incidence in the first position;
   adjusting, subsequent to the polarizing beam splitter reflecting the first light pulse, a position of the polarizing beam splitter from the first position to a second position, wherein the polarizing beam splitter is at a second angle of incidence in the second position;
   transmitting, by the polarizing beam splitter in the second position, a return light pulse through the polarizing beam splitter, the return light pulse based on the first light pulse; and
   detecting, by a detector, the return light pulse,
   wherein a frequency of rotation of the polarizing beam splitter between the first position and the second position corresponds to a frequency at which the emitter emits light.

2. The method of claim 1, wherein adjusting the angle of incidence to the second angle of incidence takes place after the emitter emits the first light pulse and before the return light pulse is received at the polarizing beam splitter.

3. The method of claim 1, further comprising:
   adjusting, subsequent to receiving the return light pulse, the polarizing beam splitter from the second position to the first position.

4. The method of claim 1, wherein adjusting the angle of incidence includes adjusting the angle of incidence using at least one of a voice coil motor and a non-vibrating motor.

5. The method of claim 1, wherein a difference between the first position and the second position is less than 5 degrees.

6. The method of claim 1, wherein the first angle of incidence is approximately 45 degrees and the second angle of incidence is approximately 43.5 degrees.

7. The method of claim 1, wherein the first light pulse is in a first polarization state, and wherein the return light pulse includes light in the first polarization and light in a second polarization state, and wherein the polarizing beam splitter is configured to transmit at least a portion of both the light in the first polarization state and the light in the second polarization state.

8. The method of claim 7, wherein at least 90% of the light in the first polarization state and the light in the second polarization state is transmitted by the polarizing beam splitter in the second position.

9. The method of claim 1, wherein a spring is fixed to a first side of the polarizing beam splitter, and wherein a motor is fixed to a second side of the polarizing beam splitter, the second side being opposite to the first side.

10. The method of claim 9, further comprising changing the frequency at which the emitter emits light to align with a resonant frequency of the motor.

11. A system, comprising:
an emitter configured to emit a first light pulse;
a detector configured to receive a return light pulse, the return light pulse comprising a reflection of the first light pulse;
a polarizing beam splitter rotating between a first position where the polarizing beam splitter reflects the first light pulse and a second position where the polarizing beam splitter transmits the return light pulse; and
an actuator that selectively moves the polarizing beam splitter between the first position and the second position,
wherein a frequency of rotation of the polarizing beam splitter between the first position and the second position corresponds to a frequency at which the emitter emits light.

12. The system of claim 11, wherein the actuator is configured to move the polarizing beam splitter from the first position to the second position after the emitter emits the first light pulse and before the return light pulse is transmitted by the polarizing beam splitter.

13. The system of claim 11, wherein the actuator is configured to move the polarizing beam splitter from the second position to the first position after the return light pulse is transmitted by the polarizing beam splitter and before the emitter emits a second light pulse.

14. The system of claim 11, wherein the actuator includes at least one of a voice coil motor and a non-vibrating motor.

15. The system of claim 11, wherein a difference between the first position and the second position is less than 5 degrees.

16. The system of claim 11, wherein the first position corresponds to an angle of incidence of approximately 45 degrees and the second position corresponds to an angle of incidence of approximately 43.5 degrees.

17. The system of claim 11, wherein the first light pulse is in a first polarization state,
wherein the return light pulse includes light in a first polarization and light in the second polarization state, and
wherein the polarizing beam splitter is configured to transmit at least a portion of both the light in the first polarization state and the light in the second polarization state.

18. The system of claim 17, wherein at least 90% of the light in the first polarization state and the light in the second polarization state is transmitted by the polarizing beam splitter in the second position.

19. The system of claim 11, further comprising:
a spring fixed to a first side of the polarizing beam splitter; and
a motor fixed to a second side of the polarizing beam splitter, the second side being opposite to the first side.

20. The system of claim 19, wherein the frequency at which the emitter emits light aligns with a resonant frequency of the motor.

21. A non-transitory computer readable medium including computer-executable instructions stored thereon, which when executed by one or more processors, cause the one or more processors to perform operations of:
adjust a position of a polarizing beam splitter to a first position, wherein the polarizing beam splitter is at a first angle of incidence in the first position relative to a path of light emitted by an emitter;
emit, by the emitter, a first light pulse in the path directed at the polarizing beam splitter;
adjust, subsequent to the polarizing beam splitter reflecting the first light pulse, a position of the polarizing beam splitter from the first position to a second position, wherein the polarizing beam splitter is at a second angle of incidence in the second position; and
receive, by a detector, a return light pulse based on the first light pulse, the return light pulse being transmitted by the polarizing beam splitter in the second position,
wherein a frequency of rotation of the polarizing beam splitter between the first position and the second position corresponds to a frequency at which the emitter emits light.

22. The non-transitory computer readable medium of claim 21, wherein a difference between the first angle of incidence and the second angle of incidence is five degrees or less.

23. The non-transitory computer readable medium of claim 21, wherein adjusting the angle of incidence to the second angle of incidence is after the emitter emits the first light pulse and before the return light pulse is received at the polarizing beam splitter.

24. The non-transitory computer readable medium of claim 21, wherein the computer-executable instructions further cause the one or more processors to:
adjust, subsequent to receiving the return light pulse, the polarizing beam splitter from the second position to the first position.

25. The non-transitory computer readable medium of claim 21, wherein a spring is fixed to a first side of the polarizing beam splitter, and
wherein a motor is fixed to a second side of the polarizing beam splitter, the second side being opposite to the first side.

26. The non-transitory computer readable medium of claim 25, wherein the computer-executable instructions, which when executed by the one or more processors, cause the one or more processors to further perform an operation of changing the frequency at which the emitter emits light to align with a resonant frequency of the motor.

* * * * *